Oct. 27, 1931.  C. BAHNER ET AL  1,829,330
POSITIVE UNLOADING DEVICE
Filed April 27, 1931

INVENTORS
Clement Bahner and Charles H. Grody
BY Howard S. Smith
Their ATTORNEY

Patented Oct. 27, 1931

1,829,330

UNITED STATES PATENT OFFICE

CLEMENT BAHNER, OF WILMINGTON, AND CHARLES H. GRADY, OF SPRINGFIELD, OHIO, ASSIGNORS TO THE AUTO COMPRESSOR COMPANY, OF WILMINGTON, OHIO, A CORPORATION OF OHIO

POSITIVE UNLOADING DEVICE

Application filed April 27, 1931. Serial No. 533,212.

This invention relates to new and useful improvements in positive unloading devices and the like.

It is one of the principal objects of our invention to provide automatic positive means for releasing the pressure within the cylinder of an air compressor when the piston comes to rest.

It is another important object of our invention to provide an unloading device that may be applied to either single cylinder or two cylinder opposed compressors.

It is another important object of our invention to provide an unloading device that is positive in action and not dependent on the operation of auxiliary equipment such as a pressure operated switch.

It is still another object of our invention to provide an unloading device that is operable with either a conventional check valve between the compressor and the pressure tank or a diaphragm operated check valve.

Other important and incidental objects of our invention will be set forth in the following specification and subjoined claims.

Figures 1, 2:
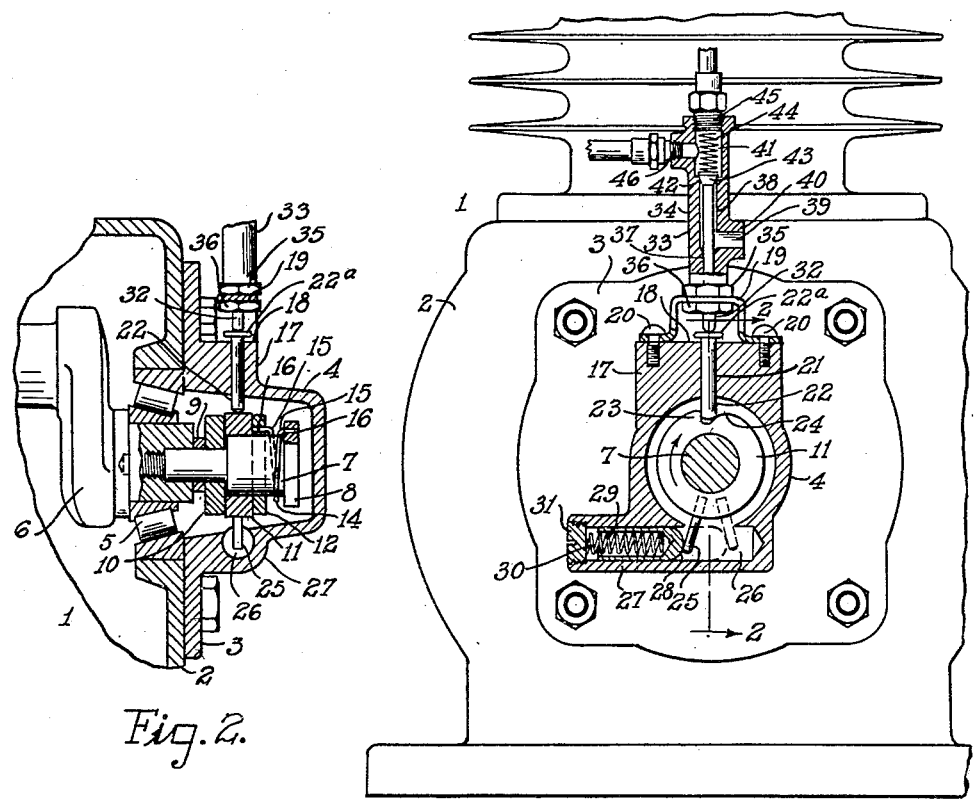
Figures 3, 4:
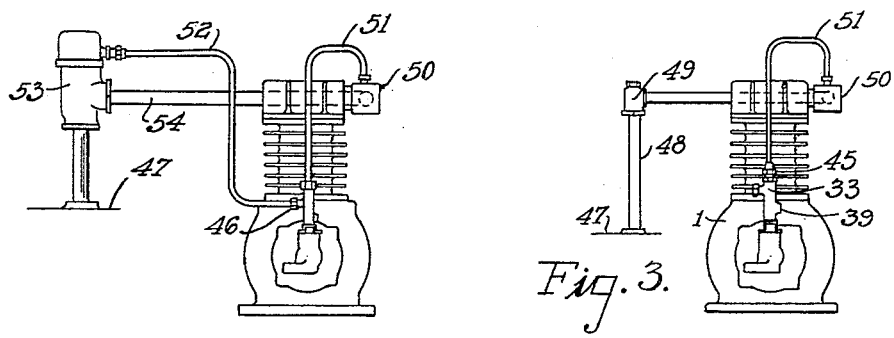

In the accompanying drawings, Figure 1 is a side view of a compressor, showing our pressure unloading device in section. Figure 2 is a sectional view through our unloader on the line 2—2 of Figure 1. Figure 3 is a view showing a compressor employing our unloading device connected with a compression tank and conventional check valve. And Figure 4 is a view showing a compressor employing our unloading device, connected with a compression tank through a check valve.

Referring now to the drawings, the numeral 1 indicates an air compressor of conventional construction, having secured to the side of its crank case 2 a bearing retainer plate 3. Formed in the center of the plate 3 is a housing 4 to receive therein our unloading device mechanism. (See Figures 1 and 2).

Journaled within a bearing 5 in the crank case 2, is one end of a crank shaft 6 that extends through the bearing 5 and into the housing 4 a short distance. The end of the crank shaft 6 is tapped to receive therein a shouldered stud 7 provided with a hexagon head 8.

Mounted upon the stud 7 adjacent to the end of the crank shaft 6 is a spacing collar 9. Between the spacing collar 9 and the shoulder of the stud 7 is a friction disc 10, adapted to engage the inner face or side of a cam disc 11. This cam disc is mounted upon the shoulder of the stud 7 about which it is free to rotate and its outer face is engaged by another friction disc 12, similar to the disc 10.

Surrounding the shoulder of the stud 7 between its head 8 and the disc 12, is a helical compression spring 14, whose ends 15, 15 are turned at right angles to its axis to be received by holes 16—16 in the hexagon head 8 and the friction disc 12. The spring 14 serves to force the friction disc into engagement with the cam disc, and to impart motion to the disc 12.

The housing 4 has an upwardly extended boss 17 upon whose top surface 18 an unloader valve bracket 19 is secured by screws 20—20.

Below the bracket 19 the boss 17 is provided with a vertical hole 21, registering with the center of the face of the cam 11, to receive a cam pin 22. The lower end of the pin 22 is rounded for engagement with the cam, and its upper end is provided with a head 22$^a$ of greater diameter than the pin 22 to prevent loss of the pin when the plate 3 is removed from the crank case 2.

The periphery of the cam 11 is provided with a radial stop shoulder 23 whose bottom or inner end is inclined to the outer periphery of the cam disc 11 by a cam rise 24.

Opposite the stop shoulder 23 the disc 11 receives a radial pin 25 that projects downwardly into a laterally extending hole 26 in a boss 27 integral with the lower part of the housing 4.

Within the hole 26 the pin is engaged by a conical end 28 of a tubular spring tensioned plunger 29. The plunger receives in its outer open end a helical compression spring 30 whose outer end is engaged by a threaded plug 31 in the outer threaded end of the hole 26. Now when the compressor is rotated in its normal direction as indicated by the arrow at Figure 1, the friction discs 10 and 12 will revolve the cam disc 11 until the shoulder 23 engages the pin 22. Then the pin 25 will assume the position shown in full lines at Figure 1 and the spring 30 will be compressed as the plunger 29 is forced toward the plug 31.

As soon as the rotation of the compressor ceases the spring 30 will overcome the frictional engagement of the friction discs 10 and 12 with the cam disc 11 and will revolve the cam disc 12 in a counter-clockwise direction as viewed at Figure 1. This counter-clockwise rotation as effected by the spring 30 is sufficient to cause the lower end of the pin 22 to rise on the cam 24 to the outer periphery of the disc 11.

When the pin 22 is raised its upper end 22ª will engage the lower end of an actuator pin 32 of an unloader valve 33.

The unloader valve in its preferred form comprises a valve body 34 whose lower threaded end is received by the bracket 19 to which it is secured by hexagon nuts 35 and 36.

The body 34 is provided with an axial hole 37 for the pin 32 and a counterbore 38 extending well to the lower end of the valve body and communicating with an exhaust port 39 in a boss 40 formed on the side of the valve body. (See Figure 1.)

The top end of the valve body is provided with a second counterbore 41 and forming at its junction with the counterbore 38, a valve seat 42 for the valve head 43 that is integral with the pin 32.

Within the counterbore 41 is a helical compression spring 44 whose lower end rests on the valve head 43 and whose upper end is retained by a nipple 45 in the upper threaded end of the valve body.

Between the nipple 45 and the valve seat 43 is a lateral port 46 that communicates with the counterbore 41 and receives in its outer threaded end, pipe connections to be hereinafter more fully described.

Now, when the actuator pin is raised by the pin 22 against the pressure of the spring 44, the valve head 43 will be raised from its seat 42 and the air will be discharged through the port 39.

As soon as the compressor is placed in operation, the cam disc 11 will revolve in the direction indicated by the arrow at Figure 1 until the stop shoulder 23 strikes the pin 22. Then the pin 22 will be forced down by the actuator pin 32 under the pressure of the spring 44 and the valve will close permitting pressure to build up above the seat 43.

Referring now to Figure 3, we have shown a conventional compressor 1 equipped with our positive type unloader and connected with a compression tank 47 by a supply line 48 through a conventional check valve 49 to a discharge port 50 on the compressor.

The discharge port 50 is also provided with a tube connection 51 to the nipple 45 at the top of the valve body of the unloading valve 33.

Now, as soon as the compressor comes to rest the unloading valve will open as previously described and the entrapped pressure in the tube 51 and cylinder of the compressor will be relieved through the exhaust port 39. In this case, with a check valve of the type shown, the port 46 is plugged or capped.

When employing a diaphragm operated check valve as shown at Figure 4, pressure is built up in a line 52 connecting the port 46 with an actuating chamber in check valve 53. As soon as this pressure becomes great enough the valve will open and air will flow through a line 54 connecting the discharge port 50 with the tank 47.

When the operation of the compressor ceases, the unloader valve will open as previously described and the pressure will be relieved from the cylinder, the lines 51 and 52 and the actuating chamber in check valve, thus permitting the latter to close.

Although we have shown our unloading device on a conventional single cylinder compressor, it may be applied with equal success to either single or opposed compressors of the single or two stage type, since its operation is not dependent upon a counter-movement of the piston and crank shaft by the entrapped pressures within the cylinder.

Having described our invention, we claim:

1. In a positive unloading device for an air compressor, a crank shaft for the compressor, an unloading valve for the latter, a cam for actuating the unloading valve, friction means operated by the crank shaft for actuating the cam, means for stopping the cam at a predetermined point, and means for actuating it in a reverse direction when the crank shaft ceases its rotation, for the purpose specified.

2. In a positive unloading device for an air compressor, a crank shaft for the compressor, an unloading valve for the latter, a cam for actuating the unloading valve, friction means operated by the crank shaft for actuating the cam, means for stopping the cam at a predetermined point without affecting the rotation of the crank shaft, and means for turning the cam in a reverse direction when the crank shaft ceases its rotation, for the purpose specified.

3. In a positive unloading device for an air compressor, a crank shaft for the compressor, an unloading valve for the latter, a disc cam formed with a shouldered recess in its periphery, a pin free to engage in said recess and to ride from it to the periphery of the cam to raise the unloading valve when the cam is turned in a counter-clockwise direction, friction means carried by the crank shaft to turn said cam clockwise until said pin enters the shouldered recess in the cam, and means for turning said cam in a reverse direction when the crank shaft ceases its rotation.

4. In a positive unloading device for an air compressor, a crank shaft for the compressor, an unloading valve for the latter, a disc cam formed with a shouldered recess in its periphery, a pin free to engage in said recess and to ride from it to the periphery of the cam to raise the unloading valve when the cam is turned in a counter-clockwise direction, friction means carried by the crank shaft to turn the cam clockwise until the pin enters the shouldered recess in the cam, and means for compression by the cam during its clockwise movement, to turn it in a counter-clockwise direction to raise the unloading valve when the crank shaft comes to rest.

5. In a positive unloading device for an air compressor, a crank shaft for the compressor, an unloading valve for the latter, a disc cam formed with a shouldered recess in its periphery, a pin free to engage in said recess and to ride from it to the periphery of the cam to raise the unloading valve when the cam is turned in a counter-clockwise direction, friction means carried by the crank shaft to turn the cam clockwise until the pin enters the shouldered recess in the cam, a projection on the latter beyond the recess, and a spring-pressed plunger adapted to be retracted by the projection when the cam is turned in a clockwise direction by the friction means, and adapted to turn said cam in a counter-clockwise direction to raise the unloading valve when the crank shaft comes to rest.

6. In a positive unloading device for an air compressor, a crank shaft for the compressor, an unloading valve for the latter, an axial stud secured to said crank shaft, a cam free to rotate on said stud for raising the unloading valve, two friction discs secured to said stud, one on each side of the cam to engage and turn it clockwise, means for stopping the cam at a predetermined point without affecting the rotation of the crank shaft, and means for turning the cam in a counter-clockwise direction to raise the unloading valve when the crank shaft comes to rest.

7. In a positive unloading device for an air compressor, a crank shaft for the compressor, an unloading valve for the latter, an axial stud secured to the crank shaft, a disc cam formed with a shouldered recess in its periphery free to rotate on said stud, a pin adapted to engage in said recess and to ride from it to the periphery of the cam to raise the unloading valve when the cam is turned in a counter-clockwise direction, two friction discs secured to the stud, one on each side of the cam, to turn the latter clockwise until the pin enters the shouldered recess in the cam, a projection on the latter opposite the recess, a plunger adapted to be depressed by the projection during the clockwise rotation of the crank shaft, and a compression spring behind the plunger to turn the cam in a counter-clockwise direction to raise the unloading valve when the crank shaft comes to rest.

In testimony whereof we have hereunto set our hands this 8th day of April, 1931.

CLEMENT BAHNER.
CHARLES H. GRADY.